United States Patent [19]

Bieman et al.

[11] Patent Number: 5,933,231
[45] Date of Patent: *Aug. 3, 1999

[54] METHOD AND SYSTEM FOR MEASURING CAVITIES AND PROBE FOR USE THEREIN

[75] Inventors: Leonard H. Bieman, Farmington Hills; Kevin G. Harding, Ann Arbor, both of Mich.

[73] Assignee: Industrial Technology Institute, Ann Arbor, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/676,634

[22] Filed: Jul. 10, 1996

[51] Int. Cl.⁶ .................................................. G01N 21/00
[52] U.S. Cl. .................................................. 356/241.1
[58] Field of Search .................................. 356/241, 237, 356/371, 375, 376, 378, 384, 387, 390, 394; 348/93, 92, 94, 91, 86, 85, 84; 250/559.24, 559.29, 559.4, 559.42

[56] References Cited

U.S. PATENT DOCUMENTS

| | | |
|---|---|---|
| 3,950,096 | 4/1976 | Aeschlimann et al. . |
| 4,493,554 | 1/1985 | Pryoretal .................................. 356/241 |
| 4,875,777 | 10/1989 | Harding . |
| 4,967,092 | 10/1990 | Fraignier et al. . |
| 5,543,972 | 8/1996 | Kamewada ............................... 356/241 |

OTHER PUBLICATIONS

Harding et al "Optics, illumination and Image Sensing for Machine VisionIV," SPIE 11/–/10 /89.
Harding "Optics, Illumination and change Sensing for Machine Vision V111," SPIE 9/8–9/93.

*Primary Examiner*—K P Hantis
*Attorney, Agent, or Firm*—Brooks & Kushman P.C.

[57] ABSTRACT

An optical method and system for measuring bore hole diameter, out-of-roundness and lobing and a probe for use therein are provided. A ring of structured light is initially formed or projected on the inner surface of a bore hole by optical components supported within a housing of the probe. A lens system also supported within the housing images the ring of light. Image merging lenses of the lens system reform the image at a video camera located at a window of the housing such that two or more arcs of the ring form a magnified image with the image of the arcs being shifted in space such that all the arcs can be viewed by the camera. The video camera image is captured by a frame grabber/ computer. A computer calculates the location of the arcs and from this information determine bore diameter and other bore properties such as out-of-roundness and lobing. The method, system and probe have the ability to capture information around the entire bore without movement of the camera or any of the optical components supported within the housing.

12 Claims, 4 Drawing Sheets

METHOD AND SYSTEM FOR MEASURING CAVITIES AND PROBE FOR USE THEREIN

TECHNICAL FIELD

This invention relates to non-contact methods and systems for measuring cavities and probes for use therein and, in particular, to electromagnetic methods and systems for measuring cavities and probes for use therein.

BACKGROUND ART

The measurement of bore hole diameters and other geometric properties of cavities has always been a challenge. An early approach has been the use of plug gages, where a plug of the proper diameter is inserted in the bore. If the plug is too loose, the bore is too big and if the plug is too tight, the bore is too small.

A more quantitative measure of the bore is provided by air gaging. To measure a bore hole, two jets of air flow out from an air gage in opposite directions toward the wall of the bore. The back pressure measurement is accurate only for a very small gap between the air jet and the wall of the bore. Therefore, a specific air gage is only good for a very short range of bore diameters. Also, the gage only measures two opposite points on the bore. If information is required around the entire bore, the gage must be rotated. To operate well, a bore gage requires clean pressurized air.

Recently, electronic gages have replaced some of the air gages for bore hole measurement. With electronic gaging, a position sensitive electronic probe replaces each of the air jets. Electronic probes are not as compact as air jets so the minimum diameter for electronic gaging is limited. Another drawback of electronic probes is that they require contact to make a measurement which can result in wear and breakage.

Another approach for measuring bore diameter is to use a coordinate measuring machine with a contact trigger probe. The probe is inserted into the bore, and then moved perpendicular to the bore's surface until contact is made. This is repeated until sufficient data is available to calculate the bore diameter and other desired bore properties. Using a coordinate measuring machine with a contact trigger probe, the measurement process is slow and requires a costly machine.

The U.S. patent to Harding U.S. Pat. No. 4,875,777 discloses an optical gauging system for evaluating surface shape of a workpiece along a cross-section utilizing an offaxis, high accuracy structured light profiler.

An article by Harding and Bieman the inventors hereof, entitled "Position Decoupled Optical Inspection Relay System" Volume 1194, pp. 28–35 of "Optics, Illumination, and Image Sensing for Machine Vision IV", SPIE, Nov. 8–10/ 1989, Philadelphia, Pa. discloses a relay optical system on a machine in conjunction with a mechanically decoupled imaging system on a camera.

An article by Harding one of the inventors hereof, entitled "Analysis of Methods for Image Rearrangement" Volume 2065, pp. 10–of "Optics, Illumination, and Image Sensing for Machine Vision VIII", SPIE, Sep. 8–9/ 1993; Boston, Ma. discloses the use of multiple lenses along the length of a part whose images are fed to a large collection lens.

SUMMARY OF THE INVENTION

An object of the present invention is to provide a rapid, high resolution, non-contact method and system for measuring at least one geometric characteristic of a cavity, such as a bore hole, and a probe for use therein wherein a wide variety and range of measurements can be made with no moving parts.

Another object of the present invention is to provide an optical method and system for measuring at least one geometric characteristic of a cavity, such as a bore hole, and a compact probe for use therein wherein bore holes as small as 10 mm in diameter can be measured.

Yet another object of the present invention is to provide an optical method and system for measuring at least one geometric characteristic of a cavity, such as a bore hole, and a probe for use therein wherein arcs covering much of the inner circumference of the bore hole are measured to provide results such as the hole diameter, out-of-roundness and lobing.

In carrying out the above objects and other objects of the present invention, a method is provided for measuring at least one geometric characteristic of a cavity. The method includes the steps of projecting a ring of electromagnetic energy at an inner reflective surface of the cavity to obtain a reflected signal, imaging the reflected signal onto a detector having a field of view to obtain an electrical signal, processing the electrical signal to produce an image of the inner reflective surface of the cavity, and calculating the at least one geometric characteristic from the image.

Preferably, the electromagnetic energy is light energy and the ring is a ring of structured light.

Also, preferably, the step of imaging includes the step of shifting segments of the image so that each of the segments is within the field of view of the detector and wherein the step of calculating is based on the segments of the image.

Further in carrying out the above objects and other objects of the present invention, a system is provided for measuring at least one geometric characteristic of a cavity. The system includes a projector for projecting a ring of electromagnetic energy at an inner reflective surface of the cavity to obtain a reflected signal, a detector having a field of view and an imager for imaging the reflected signal onto the detector to obtain an electrical signal. The system further includes a signal processor for processing the electrical signal to produce an image of the inner reflective surface of the cavity and a calculator for calculating the at least one geometric characteristic from the image.

Still further, in carrying out the above objects and other objects of the present invention, a probe adapted for use in a machine vision system for measuring at least one geometric characteristic of a cavity is provided. The probe includes a housing having first and second windows and a projector supported within the housing for projecting a ring of electromagnetic energy at an inner reflective surface of the cavity to obtain a reflected signal at the first window of the housing. The probe further includes an imager supported within the housing and adapted to image the reflected signal at the second window of the housing.

The optical method, system and probe of the present invention have numerous advantages over the prior art. For example, they are:

non-contact;

they measure arcs covering much of the circumference of the bore;

they are fast; the required image could be acquired in under a millisecond and the processing of the image data could be done in under a second; and the probe is compact and able to measure bores as small as 10 mm in diameter.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
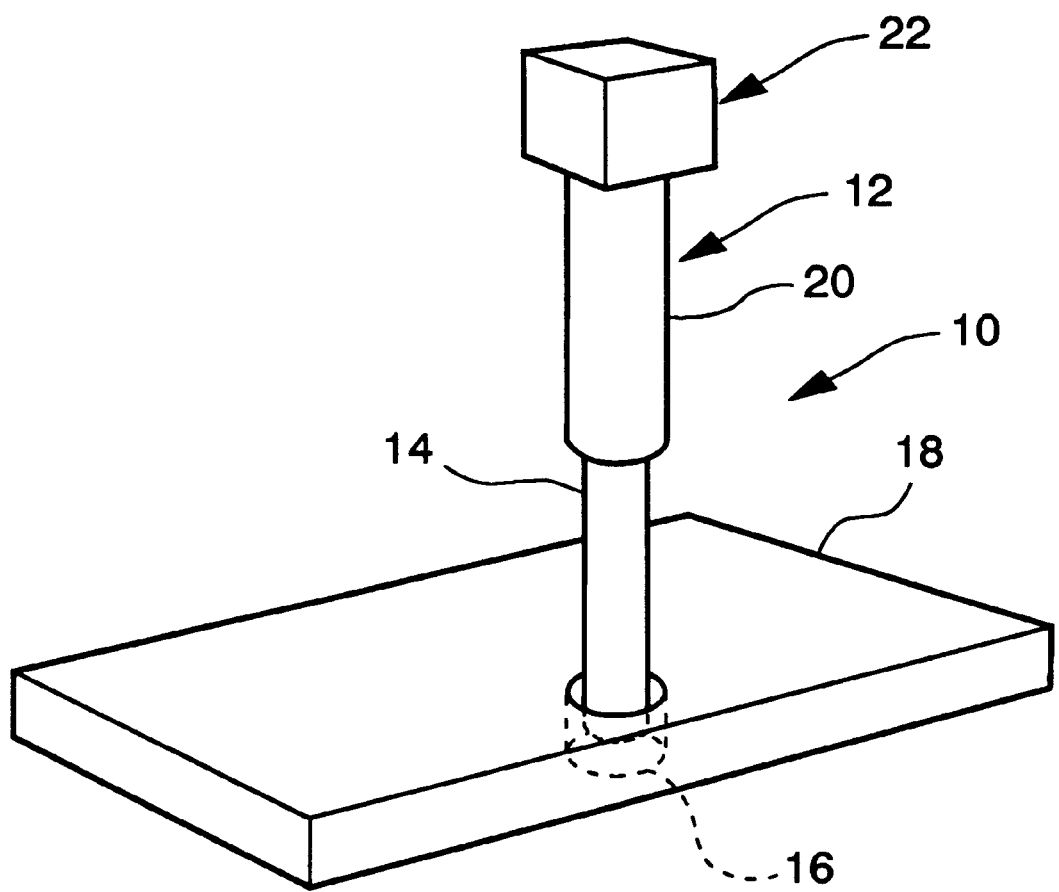
FIG. 1 is an environmental view illustrating a probe of the present invention within a bore hole.

Referring now to the drawing Figures, there is illustrated in FIG. 1 a measuring station at which the method of the present invention can be performed. A probe or bore gage, generally indicated at 10, includes an elongated, hollow housing 12. The housing 12 has a reduced diameter portion 14 inserted within a cavity such as a bore hole 16 formed in a plate such as a metal plate 18. The diameter of the reduced diameter portion 14 is typically in the range of ⅜ inches to 3 inches.

The housing 12 also has an enlarged diameter portion 20 supported on a video camera, schematically illustrated at 22. The camera 22 may be an image source such as an analog, digital or line scan camera such as RS-170, CCIR, NTSC and PAL.

Figure 2:
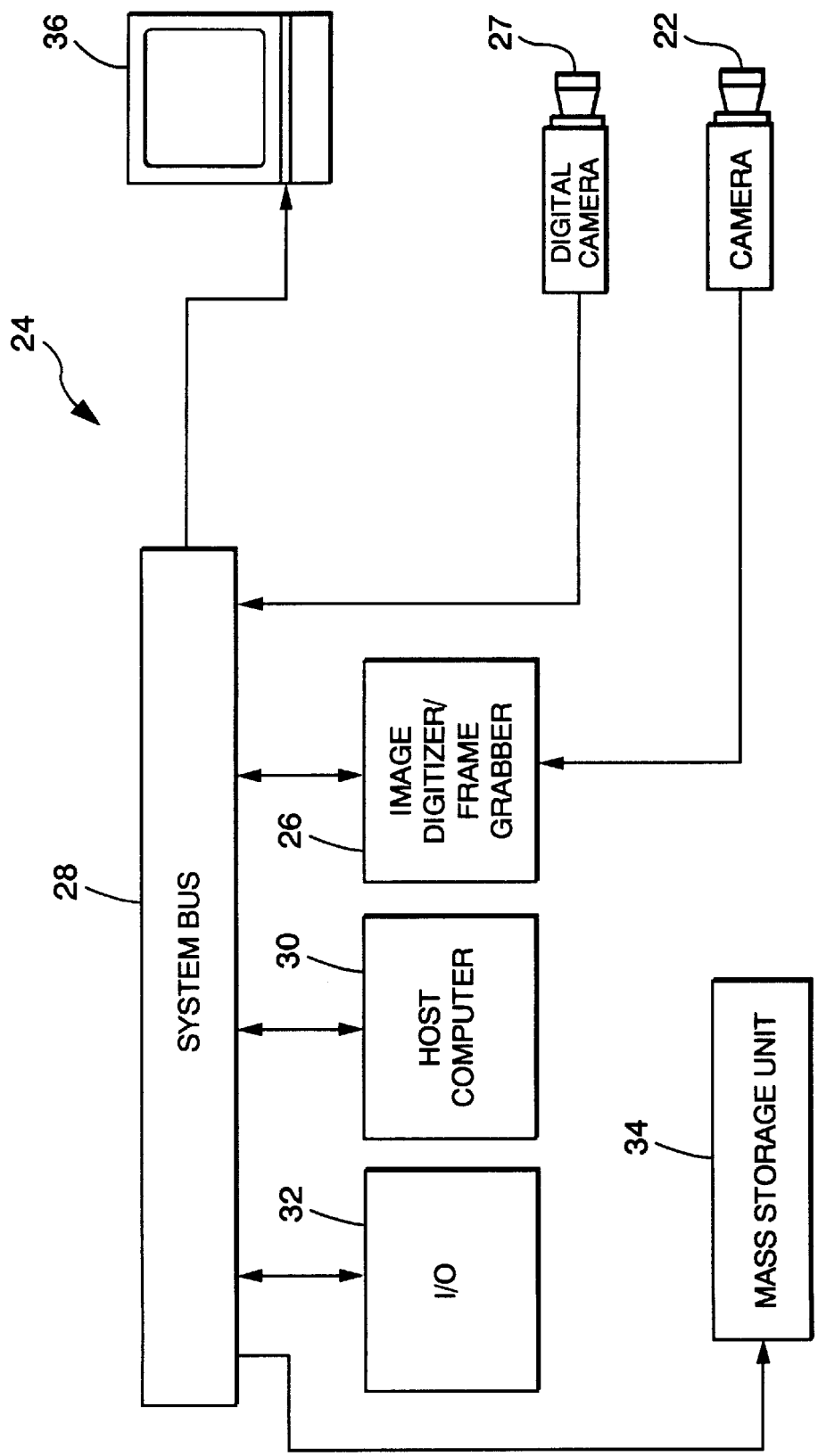
FIG. 2 is a schematic block diagram of a machine vision system for use in the method and system of the present invention.

Referring now to FIG. 2, there is illustrated schematically a machine vision system, generally indicated at 24, generally of the type which can support the method and system of the present invention. The machine vision system 24 typically includes an image digitizer/frame grabber 26. The image digitizer/frame grabber 26 samples and digitizes the input images from a detector such as the camera 22 and places each input image into a frame buffer having picture elements. Each of the picture elements may consist of an 8-bit number representing the brightness of that spot in the image. Alternatively, a digital camera 27 may be used to eliminate the need for the image digitizer/frame grabber 26.

The image digitizer/frame grabber 26 may be a conventional frame grabber board such as that manufactured by Matrox, Cognex, Data Translation or other frame grabbers. Alternatively, the image digitizer/frame grabber 26 may comprise a vision processor board such as made by Cognex.

The system 24 also includes a system bus 28 which receives information from the image digitizer/frame grabber 26 (or directly from the digital camera 27) and passes the information on to a host computer 30 such as a PC. The system bus 28 may be either a PCI, an EISA, ISA or VL system bus or any other standard bus.

The system 24 may also include input/output circuits 32 to allow the system 24 to communicate with external peripheral devices or movable machines such as robots, machine tools, programmable controllers, etc. having one or more stages to automatically move the probe 10. The I/O circuits 32 may support a three axis stepper board (i.e. supports multiple axis control) or other motion boards.

The machine vision system 24 may be programmed at a mass storage unit 34 to include programs for image processing, image analysis, calibration, and/or interactive CAD/geometry, as described in greater detail hereinbelow. Examples of image processing may include linear and non-linear enhancement, morphology, color and image arithmetic. Also, image analysis may include search, edge, caliper, blob, template, color, 2-D and 3-D measurements. The results of such programs may be displayed on a monitor 36 such as a SVGA display.

Calibration may include non-linear, 2-D, 3-D and color calibration.

Figure 3:
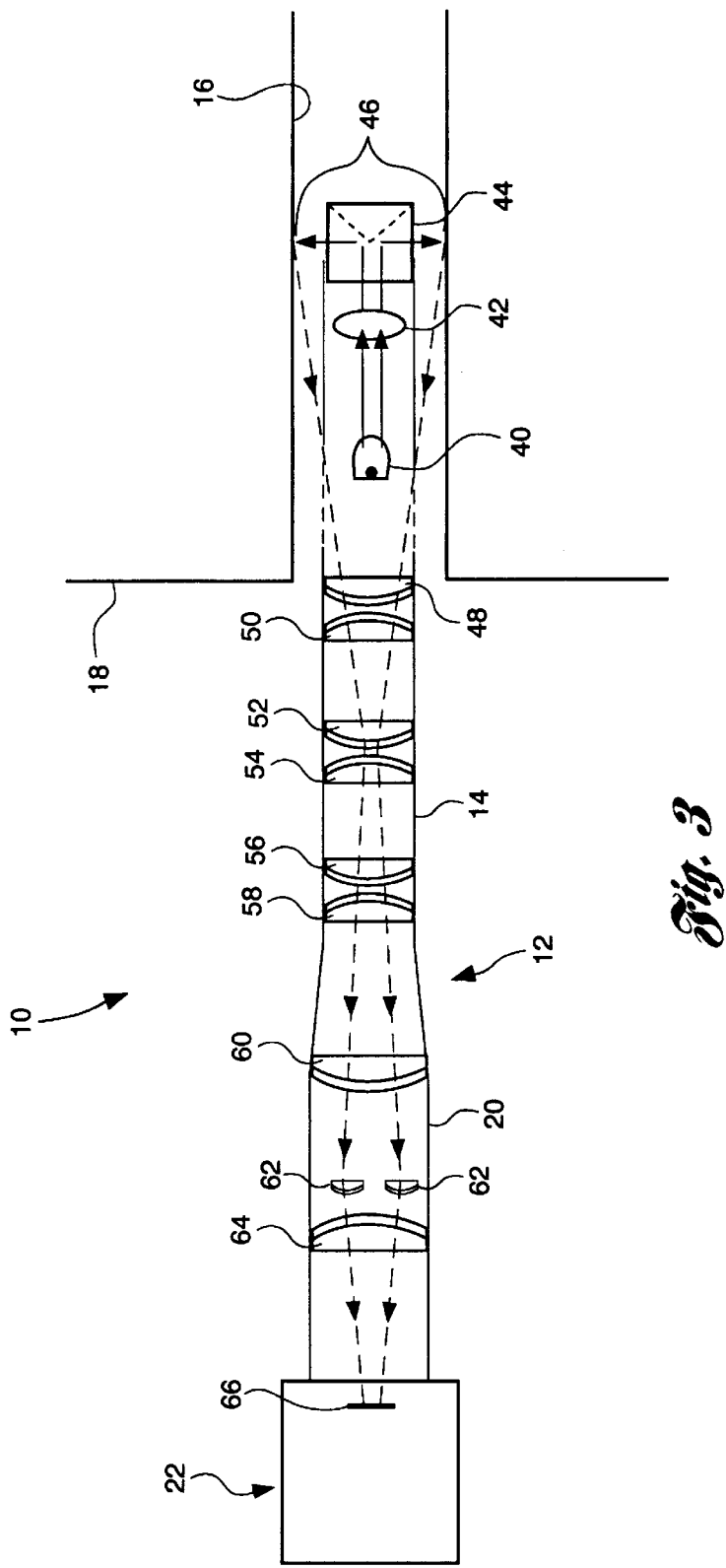
FIG. 3 is a schematic diagram of the probe within a bore hole and illustrating optical elements contained within a housing of the probe.

Referring now to FIG. 3, a layout of the optical components within the housing 12 of the optical bore gage 10 is shown. A light emitting diode 40 or some other point light source is focused by a projection lens 42 and then reflected by an optical component such as an axicon 44 to create a focused ring of light on the internal surface 46 of the bore 16. The point light source may be a laser, an optical fiber, etc. which may be strobed.

The ring of light passes through a window in the housing 12 and is imaged by a doublet lens pair 48 and 50 and relayed back towards another window in the housing 12 with optional lens pairs 52,54 and 56,58. The only purpose for the optional lens pairs 52,54 and 56,58 is to extend the length of the probe 10, allowing the measurement of deeper bores. Using even more relay pairs of lenses would allow the measurement of even deeper bores.

Figure 4:
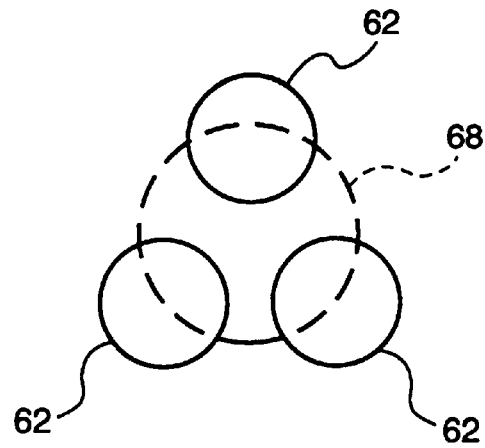
FIG. 4 is an end view of merging lenses and an image of the ring of light contained within the probe.

The image of the ring of light created by the lens set 48 through 58 is created at the principal plane of a field lens 60. This image is merged by merging optics including lenses 62 and 64 to form an image at an area array detector 66 of the video camera 22. FIG. 4 shows an end view of the merging lenses 62 with the image of the ring of light 68, shown at lens 60 super-imposed.

Figure 5:
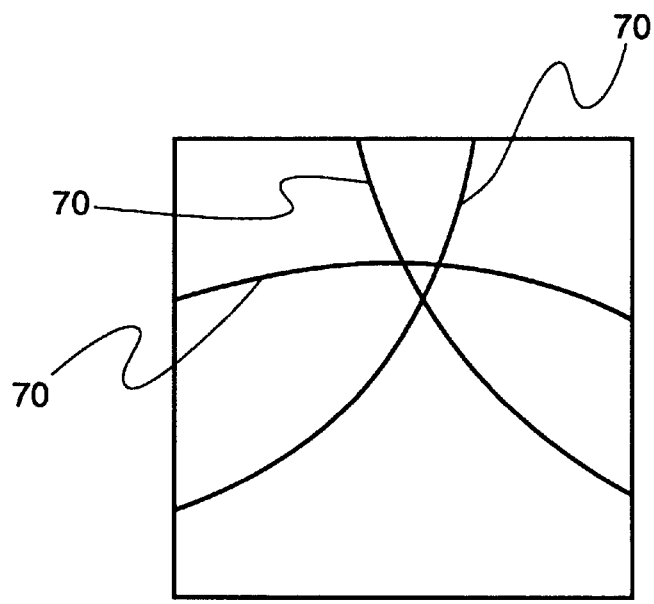
FIG. 5 is an enlarged, magnified, resulting image of intersecting arcs of the ring of light.

A key to high accuracy performance of the probe 10 is the use of the merging optics to provide a highly magnified image containing several arcs 70 or sections of the ring of light 68, as shown in FIG. 5. Using standard optics with a high magnification, such that the ring of light 68 is much larger than the field-of-view of the camera 22, then at most only a small arc could be viewed by the camera 22. The image merging optics provided by two or more lenses 62 allows the position of the image produced by the lenses 62 to be shifted such that an arc appears in the camera image for each of the lenses 62.

As previously mentioned, the resulting magnified image of arcs 70 of the ring of light 68 is shown in FIG. 5. Each of the three arcs 70 are the merging of the images created by the three lenses 62. A more detailed description of the merging optics is found in the article entitled "Position Decoupled Optical Inspection Relay System."

Merging of two or more of the arcs 70 into the video camera image provides all the information needed to make a bore hole diameter measurement. As more lenses 62 are used, more arcs 70 are superpositioned allowing more complex analysis of the bore hole 16 such as calculations of out-of-roundness and lobing. The processing of the image is based on calculating the position of the center of the arc lines using, for example, a centroid calculation. The centroid position calculated in pixel space is converted to an x,y position in calibrated engineering units. From these x,y positions, the diameter of the bore hole 16 and other information about the bore hole 16 can be calculated by the computer 30 and displayed on the display monitor 36.

When creating many arcs in the merged image, processing is complicated because analysis is complicated at the intersection points of the arcs 70. This difficulty can be reduced or eliminated in two ways. If a color camera is used and red, green, and blue filters are placed over their corresponding lenses 62, shown in FIGS. 3 and 4, then each color image (red, green or blue) will only have one arc. In other words, a color camera used with red, green and blue filters in front of the merging lenses 62 separates the images of the arcs 70.

Likewise, if a shutter is placed in front of each of the lenses 62 of FIGS. 3 and 4, and only one lens of the lenses 62 is open for a given camera frame, then by taking images as we sequence through which lens is open, the image of each arc is obtained separately. In other words, shutters in front of the merging lenses 62 allow the sequencing of the imaging so that each image only has one arc 70.

While the best mode for carrying out the invention has been described in detail, those familiar with the art to which this invention relates will recognize various alternative designs and embodiments for practicing the invention as defined by the following claims.

What is claimed is:

1. A method for measuring at least one geometric characteristic of a cavity, the method comprising the steps of:

projecting a focused ring of structured light which travels along a first path to an inner reflective surface of the cavity to obtain a reflective ring of light which travels along a second path from the inner reflective surface which is non-coincident with the first path along the entire second path;

imaging the reflected ring of light onto a detector having a field of view to obtain an electrical signal wherein the reflected ring of light is larger than the field of view of the detector and wherein the step of imaging includes the steps of shifting and magnifying separate segments of the reflected ring of light to obtain shifted and magnified segments so that each of the shifted and magnified segments intersects at least one other shifted and magnified segment within the field of view of the detector;

processing the electrical signal to produce a segmented image of the inner reflected surface of the cavity; and calculating the at least one geometric characteristic from segments of the segmented image wherein the step of calculating includes the steps of determining position and geometry of the segments of the image.

2. The method as claimed in claim 1 wherein the shifted and magnified segments of the reflected ring of light are in a single image plane.

3. The method as claimed in claim 1 wherein the shifted and magnified segments of the reflected ring of light are in separate image planes.

4. The method as claimed in claim 1 further comprising the step of coding each of the shifted and magnified segments of the reflected ring of light.

5. A system for measuring at least one geometric characteristic of a cavity, the system comprising:

a projector for projecting a focused ring of structured light which travels along a first path to an inner reflective surface of the cavity to obtain a reflected ring of light which travels along a second path from the inner reflective surface which is non-coincident to the first path along the entire second path and wherein the projector is outside the second path;

a detector having a field of view;

an imager for imaging the reflected ring of light onto the detector to obtain an electrical signal wherein the reflected ring of light is larger than the field of view of the detector and wherein the imager includes optical components to shift and magnify separate segments of the reflected ring of light to obtain shifted and magnified segments of the reflected light so that each of the shifted and magnified segments intersects at least one other shifted and magnified segment within the field of view of the detector;

a signal processor for processing the electrical signal to produce a segmented image of the inner reflective surface of the cavity; and a calculator for calculating the at least one geometric characteristic from segments of the segmented image and wherein the calculator includes at least one algorithm for determining position and geometry of the segments of the image.

6. The system as claimed in claim 5 wherein the detector is a video camera.

7. The system as claimed in claim 5 wherein the shifted and magnified segments of the reflected ring of light are in a single image plane.

8. The system as claimed in claim 5 wherein the shifted and magnified segments of the reflected ring of light are in separate image planes.

9. The system as claimed in claim 5 further comprising a coder for coding each of the shifted and magnified segments of the reflected light in the same image.

10. A probe adapted for use in a machine vision system for measuring at least one geometric characteristic of a cavity, the probe comprising:

a housing having first and second windows;

a projector supported within the housing for projecting a focused ring of structured light which travels along a first path to an inner reflective surface of the cavity to obtain a reflected ring of light which travels along a second path from the inner reflective surface which is non-coincident to the first path along the entire second path and wherein the projector is completely outside of the second path; and an imager supported within the housing and adapted to image the reflected ring of light at the second window of the housing wherein the imager includes optical components to shift and magnify separate segments of the reflected ring of light to obtain shifted and magnified segments of the reflected ring of light.

11. The probe as claimed in claim 10 further comprising a detector having a field of view which is smaller than the reflected ring of light, the detector being supported at the second window of the housing to generate an electrical signal based on the imaged reflected ring of light.

12. The probe as claimed in claim 11 wherein the shifted and magnified segments are in a single image plane.

* * * * *